United States Patent

Cheetam et al.

Patent Number: 5,841,421
Date of Patent: *Nov. 24, 1998

[54] METHOD AND SYSTEM FOR SELECTING A PREVIOUS COLOR MATCH FROM A SET OF PREVIOUS COLOR MATCHES THAT BEST MATCHES A COLOR STANDARD

[75] Inventors: William Estel Cheetam, Clifton Park, N.Y.; John Frederick Graf, Vienna, W. Va.

[73] Assignee: General Electric Company, Schenectady, N.Y.

[*] Notice: The term of this patent shall not extend beyond the expiration date of Pat. No. 5,668,633.

[21] Appl. No.: 574,013

[22] Filed: Dec. 18, 1995

[51] Int. Cl.⁶ .................................................... G01J 3/50
[52] U.S. Cl. ...................... 345/150; 356/402; 356/425; 364/526
[58] Field of Search ............................. 345/150; 356/402, 356/421, 425; 364/526; 395/131; 428/64

[56] References Cited

U.S. PATENT DOCUMENTS

| | | | |
|---|---|---|---|
| 4,654,794 | 3/1987 | O'Brien | 364/413 |
| 4,887,906 | 12/1989 | Koehler | 356/402 |
| 5,002,812 | 3/1991 | Umehara et al. | 428/64 |
| 5,502,799 | 3/1996 | Tsuji et al. | 395/131 |
| 5,668,633 | 9/1997 | Cheetam et al. | 356/402 |

*Primary Examiner*—Amare Mengistu
*Attorney, Agent, or Firm*—David C. Goldman; Marvin Snyder

[57] ABSTRACT

The present invention discloses a method and system for selecting a previously used color match from a plurality of previously used color matches that best matches a color standard. In the present invention, each of the plurality of previously used matches are identified with a spectral reflectance and a color formula. The present invention includes measuring a color spectrum and spectral reflectance of the color standard. The spectral reflectance of each of the plurality of the previously used color matches are then processed. The processed plurality of previously used color matches are searched for a set of previous color matches that have a high probability of being adapted to attain the color spectrum and spectral reflectance of the color standard. Next, a color match that provides the best match with the color of the standard is determined from the set of previous color matches. The formula of the best match is used to reproduce the color of the standard. The color formula of the best match is adapted until there is an acceptable match with the color of the standard.

11 Claims, 6 Drawing Sheets

METHOD AND SYSTEM FOR SELECTING A PREVIOUS COLOR MATCH FROM A SET OF PREVIOUS COLOR MATCHES THAT BEST MATCHES A COLOR STANDARD

BACKGROUND OF THE INVENTION

The present invention relates generally to color formulation development and more particularly to selecting a color match from a set of previously used color matches that best matches a color standard.

In color formulation development, a standard is the color sample to be matched. Typically, a spectrophotometer measures the color spectrum of the standard and a processor coupled to the spectrophotometer formulates a match with the color standard. In particular, after the color spectrum of the standard has been measured, the processor searches a database of colorants (i.e., pigments) for colorants that have been used previously to match other standards having similar color spectrums. The colorant that best matches the color spectrum of the standard is then selected and adjusted until it can exactly produce the color standard. The problem with this approach is that the current methods of searching the database of colorants and determining the applicability of the colorants to the standard is not very accurate. One of these methods determines the similarity between two colors by using an L,a,b representation of the colors. The L,a,b representation is a numerical method of representing a color, where 'L' represents the lightness to darkness of the colors, 'a' represents the redness to greenness of the colors, and 'b' represents the yellowness to blueness of the colors. The similarity between the colors is determined by calculating the sum of the squares of the difference between the L,a,b values. The problem with this method is that the similarity value is applicable for only one lighting condition and does not take into account different lighting conditions. In order to account for different lighting conditions, the similarity between colors can be determined by comparing spectral reflectance curves (i.e., a representation of the amount of light reflected at each wavelength of the visible spectrum). Typically, any two objects with the same spectral reflectance curves will produce the same color under every lighting condition. A problem with this method is that it is also not very accurate in determining the best color match. If the best color match is not selected, then any amount of adaptation that is performed in the color formula-ton process will not be enough to obtain the color standard.

SUMMARY OF THE INVENTION

Therefore, there is a need for a procedure that can select a previous color match from a set of previously used color matches that best matches a color standard. The present invention has fulfilled this need by providing processing techniques that ensure that the selected color match has a high probability of being adapted into the color standard.

Thus, in accordance with the present invention, there is provided a method and System for selecting a previously used color match from a plurality of previously used color matches that best matches a color standard. Each of the plurality of previously used matches are identified with a spectral reflectance and a color formula. The present invention includes measuring a color spectrum and spectral reflectance of the color standard. The spectral reflectance of each of the plurality of the previously used color matches are then processed. The processed plurality of previously used color matches are then searched for a set of previous color matches that have a high probability of being adapted to attain the color spectrum and spectral reflectance of the color standard. Next, a color match that provides the best match with the color of the standard is determined from the set of previous color matches. The formula of the best match is then used to reproduce the color of the standard. The color formula of the best match is adapted until there is an acceptable match with the color of the standard.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
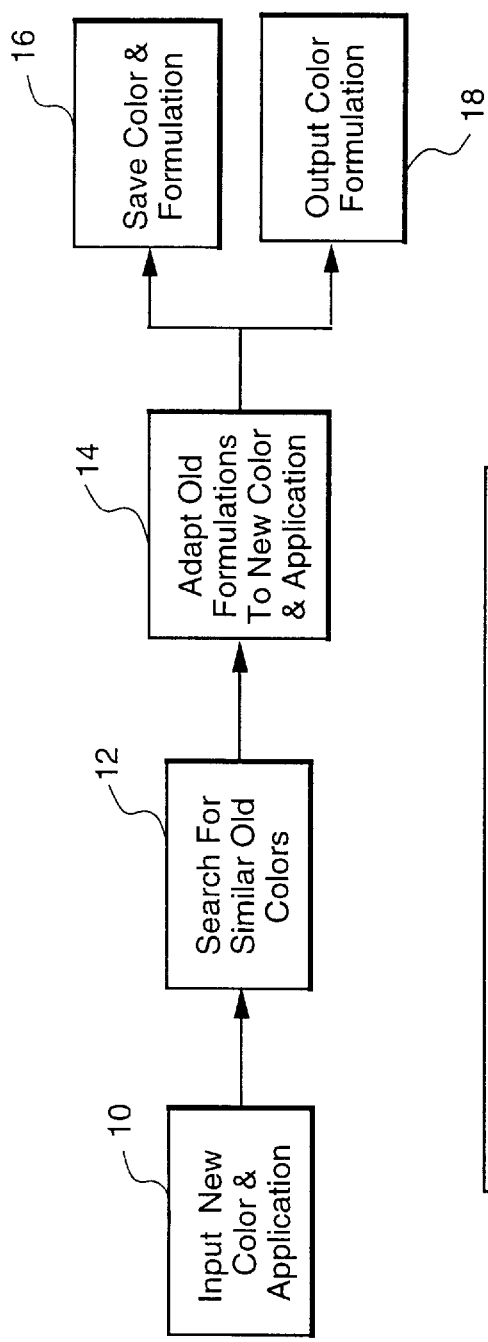
FIG. 1 is a block diagram describing a search process used in the present invention.

A block diagram describing the search process used in the present invention shown in FIG. 1. At 10, a color standard made from a material such as plastic, paper, cloth, ceramic, or the like, having a new color is received. The standard is the color sample to be matched. Given the color, the present invention searches a database. at 12 containing previously run matches having varying colors to identify cases which may provide the best match to the desired color. The present invention then adapts the colorant loadings of the closest cases at 14 to provide the best match with the desired color. Then the adapted color formulation is saved at 16 and the color formula with the highest probability of success is outputted to a user at 18. A more detail discussion of the color formulation process is provided in U.S. Pat. No. 5,668,633 entitled "A Method and System for Formulating A Color Match", which is incorporated herein by reference.

Figure 2:
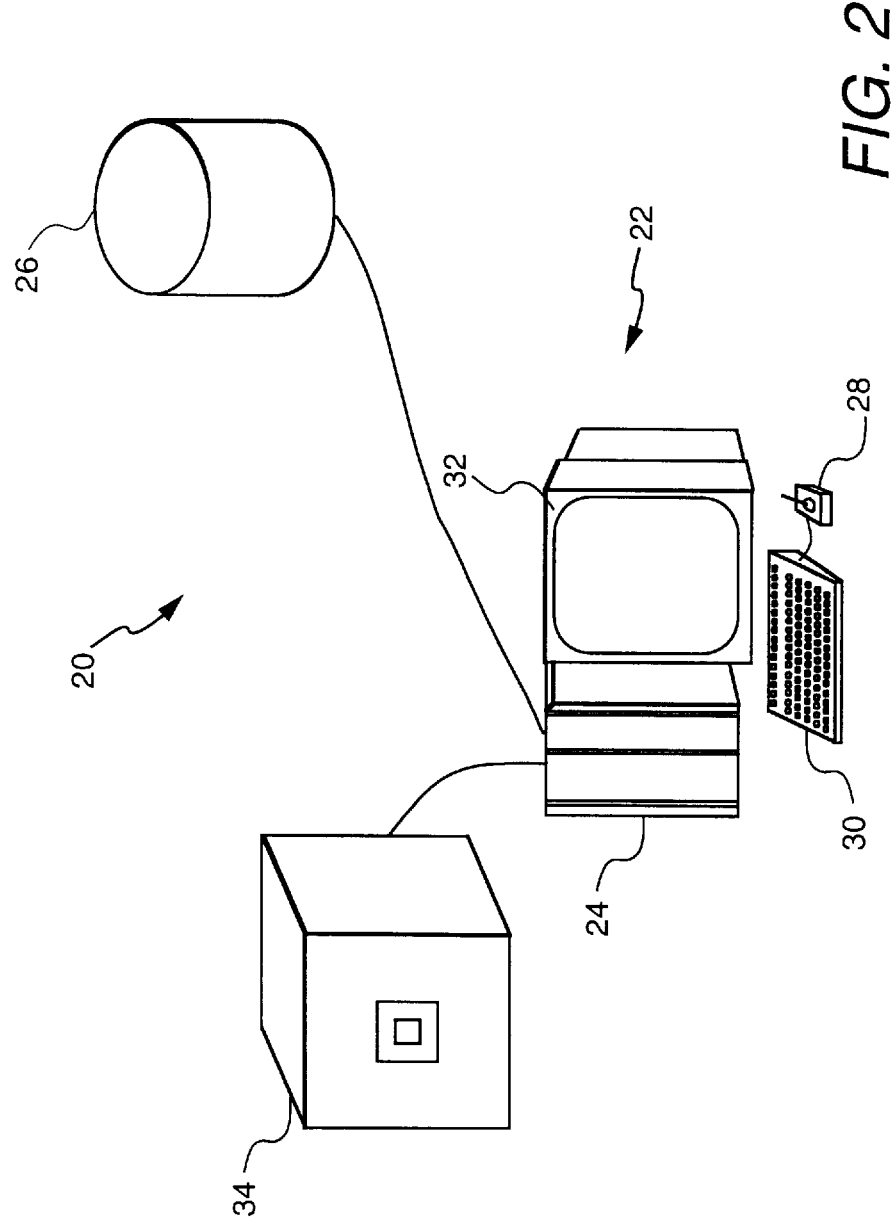
FIG.2 is a diagram illustrating the system used in the present invention.

FIG. 2 is a diagram illustrating a system 20 used in the present invention. The system includes a processor 22 such as a personal computer having a 80386 processor or higher. In the preferred embodiment of the present invention, a 486 CPU 50 MHz personal computer with 8 megabytes of RAM provides the best results. The processor is run by application software embodied in a hard disk 24 such as Microsoft MS-DOS® version 3.1 operating system or later version or Microsoft Windows® operating system. A user communicates with the processor 22 and a database 26 by a mouse or other pointing device 28 and a keyboard 30. The database 26 contains the plurality of previously used color matches with their respective spectral reflectance and color formula. The processor processes the previously used color matches and searches for a set of previous color matches that have a high probability of being adapted to attain the color spectrum and spectral reflectance of a color standard determined from a spectrophotometer 34 such as a MacBeth® 7000 or 2020 spectrophotometer. Then the processor determines a color match from the set of previous color matches that best matches the color of the standard. The results from the processor are then displayed on a display 32.

Figure 3:
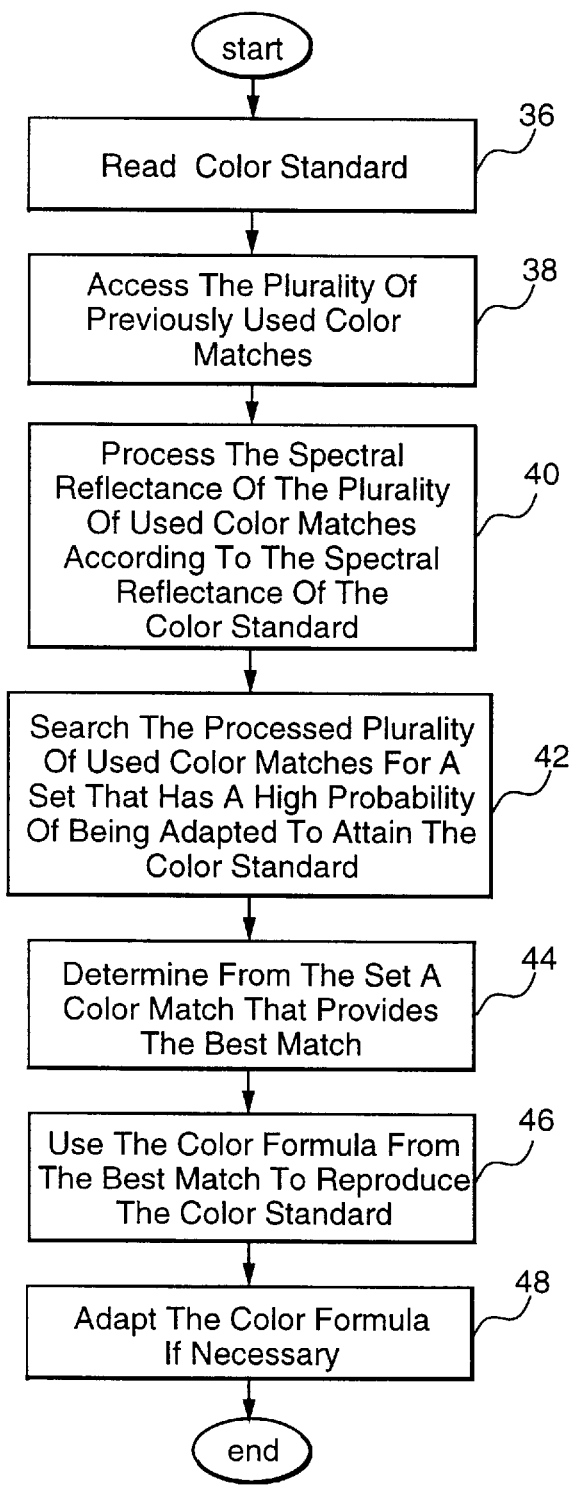
FIG. 3 is a flow chart illustrating the selection of a best color match according to the present invention.

FIG. 3 is a flow chart illustrating the selection process of a best color match according to the present invention. The selection process of the present invention starts at 36 where he color standard is placed in the spectrophotometer 34 and its color spectrum is then measured. next, the processor 22 accesses the plurality of previously used color matches from the database 26 at 38. In the illustrative embodiment of the present invention, the database 26 contains about 2000 cases of previously used color matches. Each of the color matches contain a respective spectral reflectance and a color formula. After accessing the plurality of used color matches, the processor processes the plurality of color matches according to the spectral reflectance of the color standard at 40. In particular, the processing includes in any combination normalizing, determining the slopes, or determining the minimums and maximums of the spectral reflectances. These processing steps are discussed below in further detail. Next, the plurality of processed color matches arc searched at 42 for a set of matches than have a high probability of being adapted to attain the color standard. At 44 the processor then determines from the set a color match that does provide the best match. The color formula of the best match is used at 46 to reproduce the color standard. If necessary, the color formula is adapted at 48 until it can reproduce the color standard.

Figure 4:
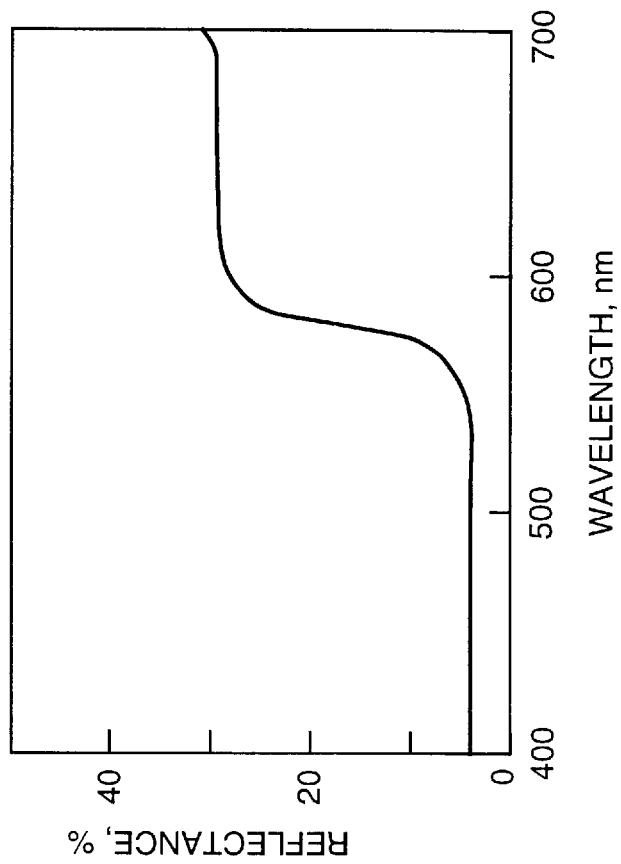
FIG. 4 is a graphical representation of a spectral reflectance curve for the visible spectrum.

As mentioned above, one of the embodiments of the present invention processes the plurality of previously used color matches according to the color standard by normalizing the spectral reflectances of the color matches to the spectral reflectance of the color standard. The spectral reflectance of a color is the amount of light reflected at each wavelength of the visible spectrum. A representation of a spectral reflectance curve for the visible spectrum (i.e., 400 nm–700 nm) of a given color is shown in FIG. 4. In particular, the x-axis contains the visible spectrum from 400 nm to 700 nm and the y-axis contains the percent of light reflectance for the visible spectrum. The color can be made lighter or darker by adding a black or white colorant. Changing the lightness or darkness of the color does not affect the shape of the spectral reflectance curve, but does moves the curve up or down the graph (i.e., changing each point on the curve the same amount). In this embodiment, the best color match is achieved by finding a previously used color match that is most easily adjusted to the standard color. More specifically, the previously used color match having a spectral reflectance curve that is most similar in shape to the spectral reflectance curve of the color standard will be the best match.

Figure 5:
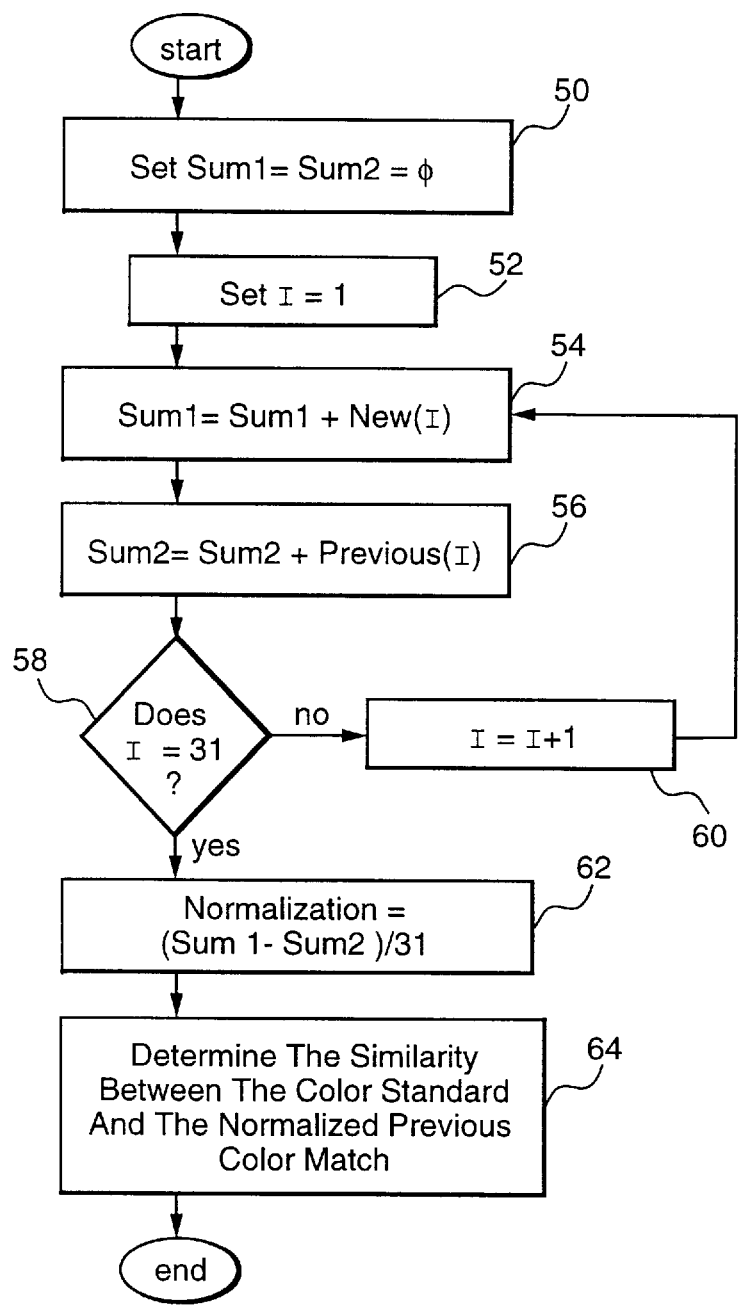
FIG. 5 is a flow chart describing the normalization operation used in the present invention.
Figure 6:
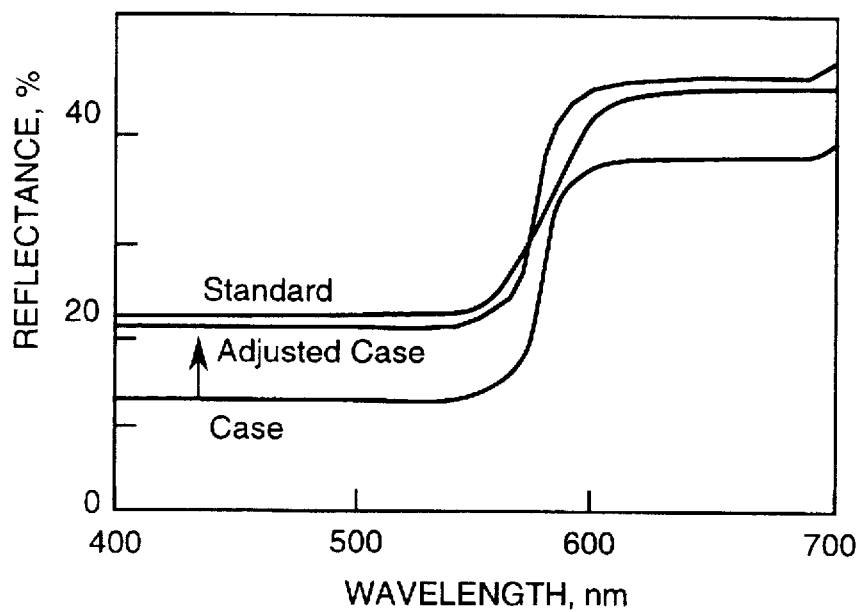
FIG. 6 shows a graphical representation of a previously used color match normalized to a color standard.

In the normalization embodiment of the present invention, all of the spectral reflectance curves of the previously used color matches are first normalized and then compared to the spectral reflectance of the color standard. The previously used color match having a normalized spectral reflectance closest to the spectral reflectance of the color standard is the best match. Before normalizing, the spectral reflectance curves are divided into 10 nm intervals throughout the visible range of 400 nm to 700 nm so that there are 31 intervals. FIG. 5 is a flow chart describing the normalization operation of the present invention. At 50, SUM1 and SUM2 which are the sums of the 31 interval values for the color standard and the previously used color match, respectively, are set initially to zero. In addition, the spectral Interval I is initially set to 1 at 52. the spectral value at the new interval I of the color standard is added to SUM1 at 54. In addition, the spectral value at the new interval I of the previous color match is added to SUM2 at 54. If the spectral interval I does not equal 31 at 58, then the interval is increased by one at 60 and the steps of 54 and 56 are continued until the interval does equal 31. After obtaining the sum of the 31 interval values for both the color standard (i.e., SUM1) and the previous color match (i.e., SUM2), the normalization is determined at 52 by taking the difference between SUM1 and SUM2 and dividing that value by 31. Next, the similarity between the color standard and the normalized previously used color match is determined at 64. the similarity can be determined in many ways. In this embodiment, the similarity can be determined by either taking the sum of the absolute value of the difference of the color standard and the normalized Previously used match or by taking the sum of the square of the difference of the color standard and the normalized previously used match. FIG. 6 shows a representation of how a previously used color match is normalized to within the color standard.

Figure 7:
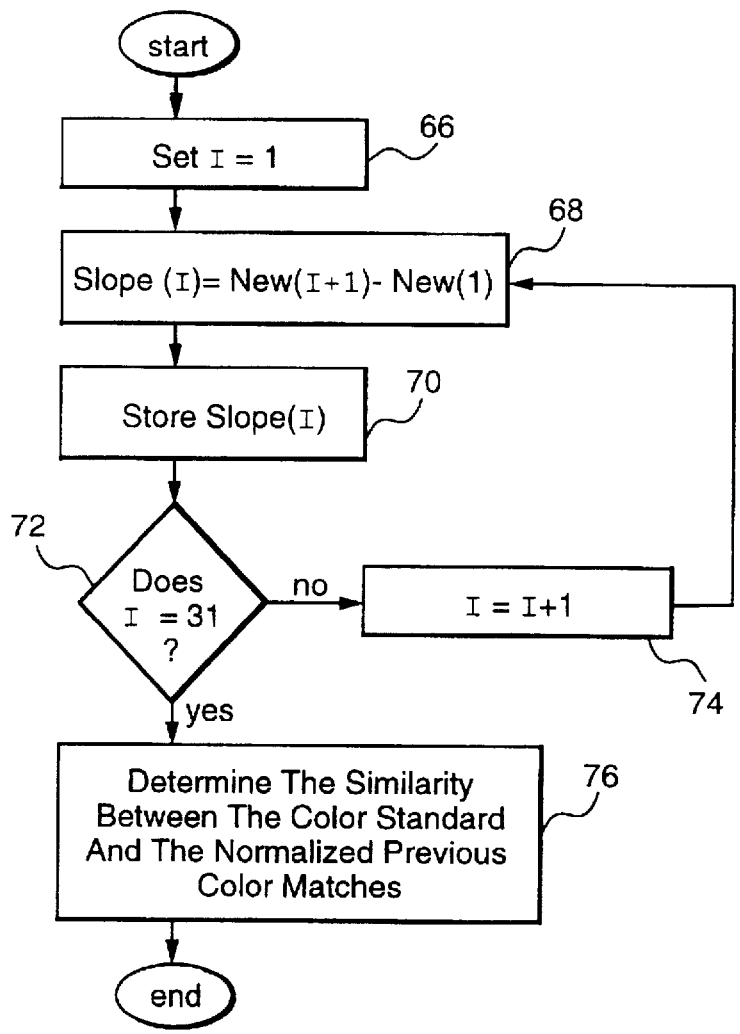
FIG. 7 is a flow chart describing the difference in slope operation used in the present invention.

In another embodiment, the similarity between the color standard and the previously used color matches is determined by finding a spectral reflectance curve with the smallest difference in slope with the color standard. Like the normalization embodiment, each of the spectral reflectance curves from the plurality of previously used color matches are divided into 10 nm intervals throughout the visible range of 400 nm to 700 nm. In this embodiment, the slope for both the color standard and the previous color match is determined at each of these intervals. FIG. 7 is a flow chart describing the determination of the slope for both the color standard and the previous color match. Initially, the spectral interval I is initially set to 1 at 66. Next, SLOPE(I), which is the value of the slope at the interval I, is determined at 68. In particular, the SLOPE(I) is determined by subtracting the value of the reflectance value on the left side of the interval from the reflectance value on the right side. The value for SLOPE(I) is then stored at 70. If the spectral interval I does not equal 31 at 72, then the interval is increased by one at 74 and the slope is determined for all 31 intervals. After obtaining the slopes at all of the 31 and the previous color match, the similarity between the two is determined at 76. In particular, the similarity is determined by either taking the sum of the absolute values or the sum of the squares as in the normalization embodiment.

Figure 8:
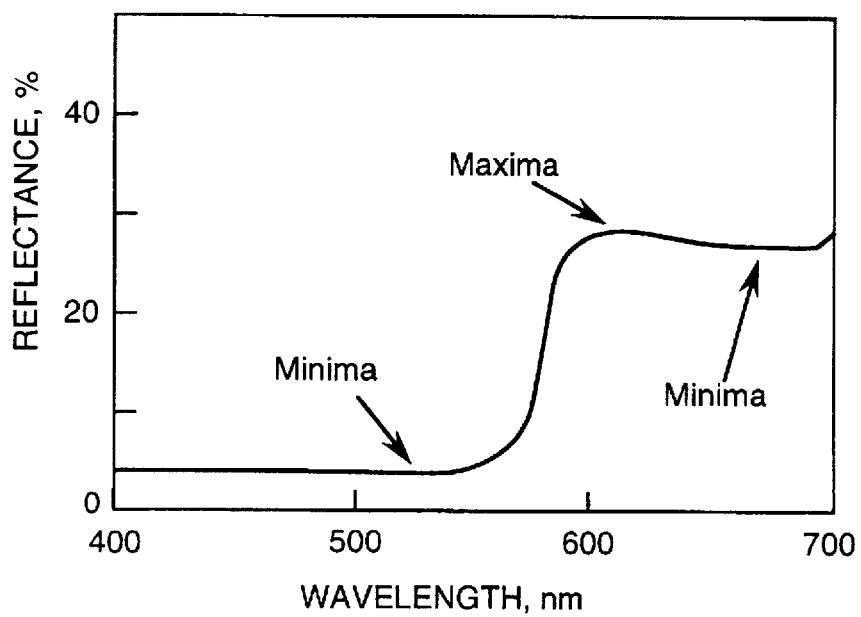
FIG. 8 shows a graphical representation showing the minima and maxima of the spectral relectances of a previously used color match.

In third embodiment, the similarity between the color standard and the previously used color matches is determined by comparing the minima and maxima of the a spectral reflectance curve of each of the previously used color matches with the color standard. If there is a similarity in minima and maxima between the color standard a color match, then their spectral reflectance curves will be similar in shape and thus color match can be adapted and used to reproduce the standard. In this embodiment, the spectral reflectance curves are converted into two lists. One list contains the wavelengths where the curve has a minima and the other list contains the wavelengths where the curve has a maxima. In order for the spectral reflectance curves to be similar in shape, they must have the same number of minima and maxima. FIG. 8 shows a graphical representation showing the minima and maxima of the spectral reflectances of a previously used color match at local depressions and humps, respectively. After determining the minima and maxima the similarity between the color standard and the previous color match is determined by either taking the sum of the absolute values or the sum of the squares. The previous color matches that are closest to the standard are then selected.

Once the best color match has been selected, then the color formula of the match is used to reproduce the color of the standard. If the color formula does not provide an optimal match, then the formula is adapted until there is an acceptable match with the color of the standard.

It is therefore apparent that there has been provided in accordance with the present invention, a method and system for selecting a previously used color match from a plurality of previously used color matches that best matches a color standard that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A computer-implemented method for selecting a previously used color match from a plurality of previously used color matches that best matches a color standard, each of the plurality of previously used matches identified with a spectral reflectance and a color formula, the method comprising the steps of:

measuring a color spectrum and spectral reflectance of the color standard;

processing the spectral reflectance of each of the plurality of the previously used color matches;

searching the processed plurality of previously used color matches for a set of previous color matches that have a high probability of being adapted to attain the color spectrum and spectral reflectance of the color standard;

determining a color match that provides the best match with the color of the standard from the set of previous color matches;

using the color formula of the best match to reproduce the color of the standard; and adapting the color formula of the best match until there is an acceptable match with the color of the standard.

2. The computer-implemented method according to claim 1, wherein the color spectrum and spectral reflectance of the color standard is obtained by a spectrophotometer.

3. The computer-implemented method according to claim 1, wherein the step of processing comprises normalizing the spectral reflectance of the plurality of previously used color matches.

4. The computer-implemented method according to claim 1, wherein the step of processing comprises determining the slopes of the spectral reflectance of the plurality of previously used color matches.

5. The computer-implemented method according to claim 1, wherein the step of processing comprises determining the minima and maxima of the spectral reflectance of the plurality of previously used color matches.

6. The computer-implemented method according to claim 1, wherein the step of searching comprises comparing the spectral reflectance of the color standard to the processed spectral reflectance of each of the plurality of previously used color matches.

7. A system for selecting a previously used color match from a plurality of previously used color matches that best matches a color standard, each of the plurality of previously used matches identified with a spectral reflectance and a color formula, the system comprising:

a spectrophotometer for measuring and a color spectrum and spectral reflectance of the color standard; and a processor for selecting a previously used color match from the plurality of previously used matches that best matches the color standard, the processor including means for processing the spectral reflectance of each of the plurality of the previously used color matches, means for searching the processed plurality of previously used color matches for a set of previous color matches that have a high probability of being adapted to attain the color spectrum and spectral reflectance of the color standard, means for determining a color match that provides the best match with the color of the standard from the set of previous color matches, means for using the color formula of the best match to reproduce the color of the standard, and means for adapting the color formula of the best match until there is an acceptable match with the color of the standard.

8. The system according to claim 7, wherein the processing means normalizes the spectral reflectance of the plurality of previously used color matches.

9. The system according to claim 7, wherein the processing means determines the slopes of the spectral reflectance of the plurality of previously used color matches.

10. The system according to claim 7, wherein the processing means determines the minima and maxima of the spectral reflectance of the plurality of previously used color matches.

11. The system according to claim 7, wherein the processor further includes means for comparing the spectral reflectance of the color standard to the processed spectral reflectance of each of the plurality of previously used color matches.

* * * * *

UNITED STATES PATENT AND TRADEMARK OFFICE
CERTIFICATE OF CORRECTION

PATENT NO. : 5,841,421
DATED : November 24, 1998
INVENTOR(S) : William Estel Cheetham, et. al.

It is certified that error appears in the above-identified patent and that said Letters Patent is hereby corrected as shown below:

Title page, item [19], "Cheetam" should be --Cheetham--.
        item [75], insert William Estel Cheetham--.

Signed and Sealed this

Ninth Day of March, 1999

*Attest:*

Q. TODD DICKINSON

*Attesting Officer*      *Acting Commissioner of Patents and Trademarks*